United States Patent [19]
Kelley et al.

[11] 3,727,409
[45] Apr. 17, 1973

[54] HYPERSONIC AIRCRAFT ENGINE AND FUEL INJECTION SYSTEM THEREFOR

[75] Inventors: Archibald P. Kelly, Leslie W. Norman, Walter H. Thompson, Jr., all of Scottsdale, Ariz.

[73] Assignee: The Garrett Corporation, Los Angeles, Calif.

[22] Filed: Mar. 30, 1961

[21] Appl. No.: 99,431

[52] U.S. Cl. ................60/270, 60/39.74, 60/39.66
[51] Int. Cl. ..............................................F02k 7/08
[58] Field of Search................60/35.6, 39.74, 39.72, 60/270

[56] References Cited

UNITED STATES PATENTS

| | | | |
|---|---|---|---|
| 1,980,266 | 11/1934 | Goddard | 60/35.6 RJ |
| 2,632,300 | 3/1953 | Brzozowski | 60/39.74 X |
| 2,692,480 | 10/1954 | Viaud et al. | 60/39.72 |
| 2,823,519 | 2/1958 | Spalding | 60/39.74 |
| 3,040,516 | 6/1962 | Brees | 60/35.6 RJ |
| 3,054,255 | 9/1962 | Stratford | 60/35.6 RJ |
| 3,075,353 | 1/1963 | Mullaney et al. | 60/39.74 |

*Primary Examiner*—Samuel Feinberg
*Attorney*—Herschel C. Omohundro and John H. G. Wallace

EXEMPLARY CLAIM

1. A detonation combustion engine adapted to produce hypersonic aircraft speeds above Mach 5, comprising:

a. an elongated aerothermodynamic duct for receiving and directing an air stream therethrough and having an inlet, a mixing section, a combustion zone, and an exhaust;

b. means in said duct for establishing and maintaining a series of shock waves in said duct between said inlet and said combustion zone with an attendant increase in static pressure and static temperature sufficient to create and support detonation combustion in said combustion zone;

c. means for removing boundary layers from the air stream passing through said duct so as to maintain supersonic laminar flow as the stream passes from the inlet to the combustion zone; and d. means immediately downstream said boundary layer removing means for injecting fuel into said air stream at the upstream end of said mixing section without interfering with said series of shock waves and said supersonic laminar flow, such fuel injection means having a sharp edge on the upstream side thereof, an elongated slot in its downstream edge, and extending between the inner surfaces of the top and bottom of the aerothermodynamic duct.

7 Claims, 6 Drawing Figures

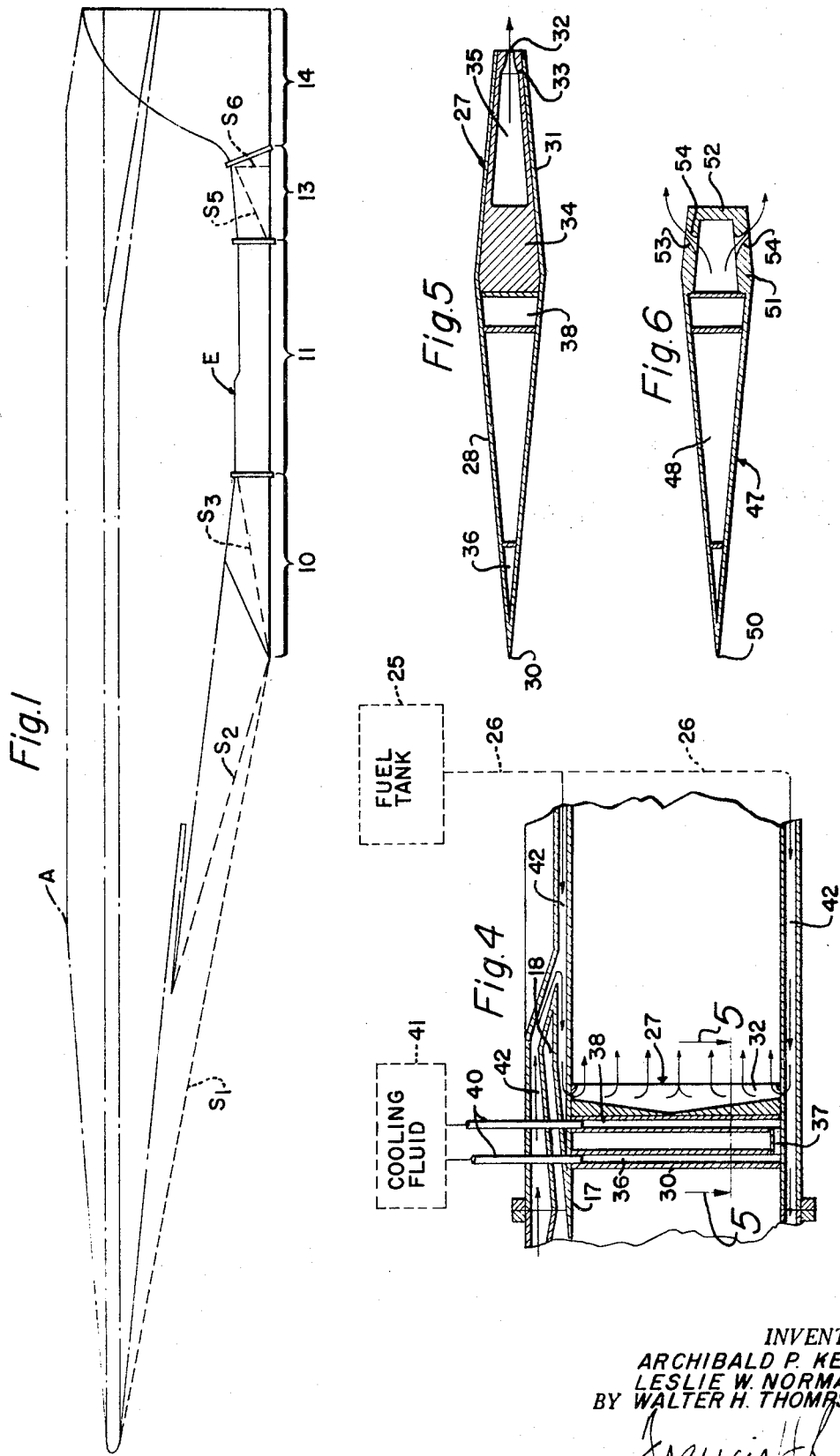

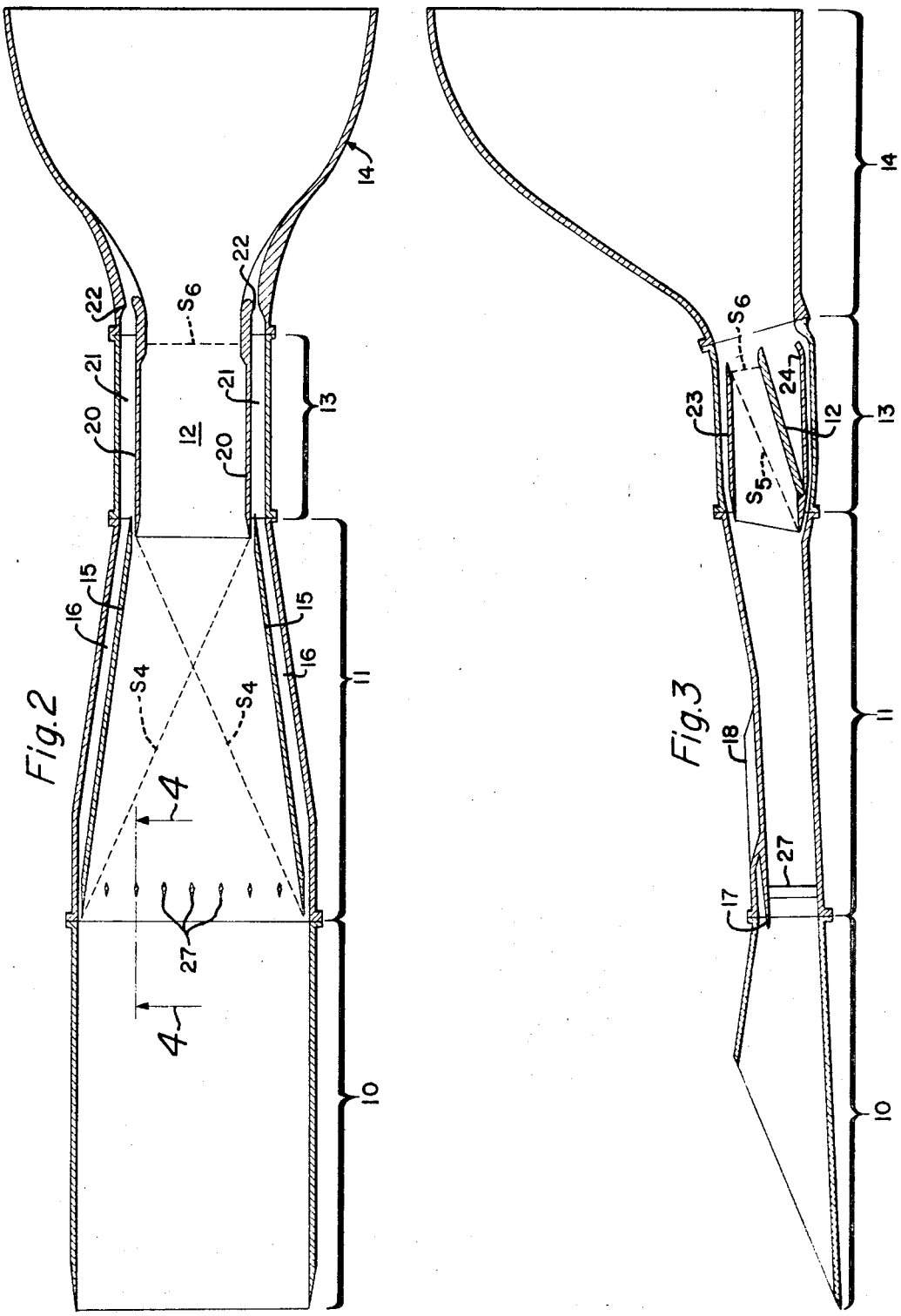

HYPERSONIC AIRCRAFT ENGINE AND FUEL INJECTION SYSTEM THEREFOR

This invention relates to fuel injection in aircraft engines, and more particularly to an efficient fuel injection system for a variable geometry detonation combustion engine designed for use in hypersonic aircraft.

In the copending application of Hunter and Norman, Ser. No. 88,149, filed Feb. 9, 1961, a variable geometry detonation combustion engine is disclosed which is designed specifically for use in hypersonic aircraft. When detonation combustion takes place in a variable geometry aerothermodynamic duct or engine, the flame front or detonation is established and maintained by the temperature rise occurring across a shock wave rather than being advanced by heat conduction, as is the case in conventional internal combustion processes, such as occur in ramjet and turbojet engines. Steady state detonation is established and maintained across a standing shock wave of fixed position relative to the confining structure therefor, and subsequent expansion of the gaseous detonation product is used to develop a continuous thrust.

According to the present invention, a suitable fuel, such as hydrogen, is injected into the aerothermodynamic duct of a detonation combustion engine in such a way as to cause a minimum disturbance of the fluid flow and shock wave pattern in the duct, and at the same time permit maximum mixing of fuel and air so as to attain minimum specific fuel consumption during the engine operation. This is accomplished, in the present instance, by the use of a plurality of vertically disposed, streamlined injector nozzles which are uniformly spaced across the width of the duct at a location upstream of the detonation zone sufficiently to permit thorough mixing of the fuel with air while avoiding premature ignition as the fuel-air mixture flows from the injector nozzles to the specific zone of detonation combustion.

It is an object of this invention to provide an efficient fuel injection system for a variable geometry detonation combustion engine.

Another object of the invention is to provide a fuel injection system for a detonation combustion engine in which the fuel is directed into a supersonic airstream through a streamlined injector nozzle.

Another object of this invention is to provide a fuel injection system for a detonation combustion engine in which the fuel is injected sufficiently close to the engine inlet to permit thorough mixing of the fuel and air while at the same time avoiding premature ignition.

Still another object of the invention is to provide a method of injecting fuel into a supersonic airstream in which a sheet-like layer of fuel is injected into the airstream under conditions which will cause the fuel to diffuse into the airstream.

It is another object of the invention to provide a fuel injection system for a detonation combustion engine having an inlet, a combustion zone and an exhaust, which system includes a plurality of streamlined injector nozzles uniformly spaced across the width of the engine in a longitudinal position between the inlet and the combustion zone.

A further object of the invention is to provide a fuel injection system for a detonation combustion engine having an inlet, a combustion zone and an exhaust, which system includes a plurality of streamlined injector nozzles uniformly spaced across the width of the engine in a position between the inlet and the combustion zone and means for cooling the nozzles during operation of the engine.

The above and other features and objects of the invention will be apparent from the following description and the accompanying drawing, in which:

FIG. 1 is a schematic view of a hypersonic aircraft which is powered for cruising by a detonation combustion engine in which the fuel injection system embodying this invention may be used;

FIG. 2 is a horizontal sectional view of the detonation combustion engine shown in FIG. 1;

FIG. 3 is a longitudinal vertical sectional view of the detonation combustion engine;

FIG. 4 is a somewhat enlarged fragmentary vertical sectional view, substantially along the line 4—4 of FIG. 2, showing the portion of the engine in which the fuel injectors are placed;

FIG. 5 is an enlarged horizontal sectional view of one of the injector nozzles, the view being taken along the line 5—5 of FIG. 4; and FIG. 6 is a sectional view, similar to FIG. 5, showing a modified form of the injector nozzle.

Experiment has shown that detonation combustion, as that term is used herein, takes place under the following conditions:

1. a stream of gases is moving supersonically relative to the aerothermodynamic duct or engine;
2. the total temperature of the supersonic gas stream exceeds the detonation temperature of the gas stream;
3. the gas stream consists of a mixture of some oxidizer, such as air, and unburned fuel, such as hydrogen; and
4. a shock system of such strength is generated at some point in the aerothermodynamic duct that the static temperature across the shock system is high enough to cause detonation.

This type of detonation can occur across a normal shock wave whence the Mach number downstream of the shock wave will be subsonic. The same phenomena may also occur across an oblique shock wave as long as the static temperature downstream of the shock wave is sufficiently high to cause detonation.

Referring now to FIGS. 1, 2 and 3, a hypersonic aircraft A, shown schematically, is powered by a variable geometry detonation combustion engine E to produce hypersonic speeds in the range of 6 to 7 Mach number at altitudes of about 125,000 feet. The design of the airframe, the engine inlet, and the internal configuration of the engine duct are such as to produce a series of shock waves $S_1$, $S_2$, $S_3$, $S_4$, $S_5$, and $S_6$, which will slow the captured flow from a freestream Mach number of 6.5 to a Mach number of about 2.5 at the upstream edge to the detonation zone. The manner of producing the shock waves to accomplish this reduction in Mach number, with an attendant increase in static pressure and static temperature, is fully described in the copending Hunter and Norman application referred to above. Briefly, the design of the airframe is such that first and second critical shock waves $S_1$ and $S_2$ are produced upstream of the inlet to engine E so that the Mach number of the airstream is reduced to about 5.5 at the inlet 10 of the engine. The geometry of the inlet and the inner walls of the engine are such that shock wave $S_3$ forms across the inlet section and a pair of intersecting oblique shock waves $S_4$ (FIG. 2) form across the mixing section 11 of the engine duct. Next, critical shock wave $S_5$ is created by the leading edge of an adjustable ramp or door 12 which is arranged in the combustion zone or section 13 of the duct immediately upstream from the last normal shock wave $S_6$. In the area between waves $S_5$ and $S_6$, the Mach number is about 2.5 and the static temperature will have increased to about 1,820°R, and these physical conditions are at least partially controlled by the angle of the adjustable ramp. The last wave $S_6$ is the one across which detonation combustion takes place.

It will be understood that a stepwise increase in static temperature accompanies each successive shock wave in the aircraft and engine duct system. To take advantage of this increase, a fuel, such as hydrogen, having a detonation temperature below the static temperature occurring in the normal shock wave $S_6$, is recommended. Such fuel is injected into the fluid stream in accordance with this invention, as will be described hereinafter. It has been mentioned that the static temperature occurring on the combustion ramp between waves $S_5$ and $S_6$ is controllable but may be higher than the temperature required for initiation of combustion in the air-hydrogen mixture. The time required for this mixture to flow over the ramp 12 is so short, however, in comparison to the time needed to achieve combustion, that the mixture may remain chemically unaffected until it reaches normal shock wave $S_6$. Here the static temperature rises with consequent detonation of the mixture and a further increase in temperature to about 4,950°R and reduction in Mach number to about 0.80. Finally, as the products of combustion pass through the exhaust nozzle 14, the Mach number increases and the temperature reduces to provide the desired conditions of thrust.

Though not forming part of this invention, there is provision in the engine E for the removal of boundary layers as the fluid stream passes through the engine duct. Thus, the mixing section of the duct has special side walls 15 which are spaced from the regular duct walls to form bleed-off passages 16. Boundary layer air is bled into the passages 16 by the sharp leading edges of the walls 15. Any boundary layers adjacent the top of the duct may be removed by a special top wall 17 (FIG. 3) which is shaped to form ducts 18, which lead into the side bleed-off passages 16. In the combustor section 13, special side walls 20 are spaced from the duct walls and form passages 21 which terminate in nozzles 22 leading into the exhaust section 14. As clearly shown in FIG. 2, the passages 16 empty into the passages 21 which also include any boundary layer air forming along the inner surfaces of the walls 15, and such air is bled into said passages 21 by the sharp leading edges of the walls 20. Top and bottom boundary layers may also be removed at the entrance to the combustion zone 13 by special upper and lower walls 23 and 24, respectively, shown in FIG. 3. Any such removed boundary layer air is reintroduced into the fluid stream immediately downstream of the standing detonation wave $S_6$.

As thus far described, the engine E constitutes an efficient aerothermodynamic duct in which the boundary layers are effectively removed so as to maintain supersonic laminar flow as the stream passes from the inlet to the zone of combustion. It is into this stream that a gaseous fuel, such as hydrogen, is fed or injected in accordance with this invention and in a manner which causes a minimum of disturbance to the shock wave pattern in the duct and at the same time permits efficient mixing so as to effect minimum specific fuel consumption while avoiding premature ignition.

Such fuel injection is accomplished in the present instance, as indicated in FIGS. 2, 4 and 5, by feeding the fuel from a suitable source or tank 25 through primary supply lines 26 to a plurality of special injector nozzles 27. The location of the injector nozzles 27 longitudinally of the duct is an important aspect of this invention for several reasons. If the injectors are too far downstream from the inlet, there may not be proper mixing of the fuel and air prior to reaching the combustor ramp 12 and ultimately the shock wave $S_6$ where detonation takes place. In addition, the location of the nozzles with respect to the boundary layer bleed-off passages is also critical, since it is not desired to bleed off any of the fuel. Considering all aspects of the problem, it has been found that the fuel injectors may be most advantageously located longitudinally in the duct if they are placed in a plane or zone substantially immediately between the inlet section 10 and the mixing section 11 of the duct or engine; that is, said fuel injectors are preferably located at or adjacent the upstream end of the mixing section of the duct.

In order to reduce or prevent any objectionable disturbance to the shock wave pattern in the engine duct, the nozzles 27 are streamlined in shape and each nozzle preferably extends from the top to the bottom of the duct. The streamlined shape that has been found most suitable from the standpoint of ease of construction and minimum flow disturbance is that of a double wedge or diamond having an upstream wedge or portion 28 with a sharp leading edge 30, and a downstream wedge or portion 31 having an elongated slot 32 in the downstream edge thereof. In the form shown in FIGS. 4 and 5, the slot 32 is the outlet of a special nozzle 33 which is inserted between walls of the downstream wedge 27 and may be part of a passage forming member 34. This member 34 is shaped to fit inside the diamond-shaped injector, and may fill the entire inner space, if desired, and provides a fuel distributing chamber 35 which is narrow at the top and bottom and gradually widens toward the center or at a point midway between the top and bottom. Such shape of the fuel distributing chamber 35, when fuel is fed into the narrow portions at the top and bottom of the chamber, tends to allow a substantially uniform distribution and flow through the nozzle 33 throughout the length thereof.

In this manner, the fuel is injected through each nozzle in the form of a vertically disposed uniform sheet which is fed or injected into the supersonic airstream. Because of the provision of the sharp leading edges 30 on the streamlined injectors, weak shock waves will be created in the airstream, but any such waves are dissipated shortly downstream of the injectors. Thus, the uniform sheets of fuel from the nozzle slots 32 are injected into and mixed with the passing airstream. By injecting the fuel under the proper conditions, said fuel may be additionally diffused into the airstream adjacent the injectors. The intersecting oblique shock waves $S_4$ assist in causing further mixing as the fuel and air pass on through the mixing section 11 of the engine duct.

Recovery of the ram temperature at the faces of the streamlined injector nozzles causes some heat to be generated in said nozzles and particularly in the upstream wedges 28 thereof. To increase efficiency and also minimize the danger of preignition of the fuel, it is desirable to cool the injector nozzles. Thus, as shown in FIGS. 4 and 5, the inside of the upstream wedge 28 adjacent leading edge 30 may be provided or formed with a cooling passage 36 which extends from the top of the nozzle to the bottom, where it may be connected by a conduit 37 to a second cooling passage 38. These passages 36 and 38 may be connected by conduit 40 with a suitable source 41 of cooling fluid. In the case of an engine utilizing a fluid or gaseous fuel, such as hydrogen, there is the added advantage that the hydrogen may also be employed as the cooling fluid; and in such case the fuel tank 25 and cooling fluid source 41 may be combined. The walls of the engine duct may also be constructed with cooling passages 42 and these may be integrated into the entire fuel and cooling system so that the fuel fed to the injectors 27 may be taken from one of the passages 42. Obviously, the upper and lower ends of the passage 35 may be directly connected to the fuel source, if desired.

In FIG. 6 a modified form of streamlined fuel injector 47 is shown as including an upstream wedge portion 48 having a sharp leading edge 50. Instead of injecting the fuel through a single slot, however, the downstream end 51 of the injector is cut off or made with a blunt end 52. A distribution passage 53, which may be shaped throughout its length like the passage 35 to provide effective distribution of the fuel therein, is formed in the reduced downstream portion 51 of the modified injector. To inject the fuel from the passage 53 into the passing airstream, angularly or downstream directed nozzles 54 are formed in each of the side walls, as shown. This arrangement injects a plurality of sheet-like streams of fuel into the airstream immediately after said stream passes the leading wedge of the streamlined injectors 47.

Various changes may be made in the construction and certain features may be employed without others without departing from this invention or sacrificing any of its advantages.

We claim:

1. A detonation combustion engine adapted to produce hypersonic aircraft speeds above Mach 5, comprising:
  a. an elongated aerothermodynamic duct for receiving and directing an air stream therethrough and having an inlet, a mixing section, a combustion zone, and an exhaust;
  b. means in said duct for establishing and maintaining a series of shock waves in said duct between said inlet and said combustion zone with an attendant increase in static pressure and static temperature sufficient to create and support detonation combustion in said combustion zone;
  c. means for removing boundary layers from the air stream passing through said duct so as to maintain supersonic laminar flow as the stream passes from the inlet to the combustion zone; and
  d. means immediately downstream of said boundary layer removing means for injecting fuel into said air stream at the upstream end of said mixing section without interfering with said series of shock waves and said supersonic laminar flow, such fuel injection means having a sharp edge on the upstream side thereof, an elongated slot in its downstream edge, and extending between the inner surfaces of the top and bottom of the aerothermodynamic duct.

2. A detonation combustion engine adapted to produce hypersonic aircraft speeds above Mach 5, comprising:
  a. an elongated aerothermodynamic duct for receiving and directing an air stream therethrough and having an inlet, a mixing section, a combustion zone, and an exhaust;
  b. means in said duct for establishing and maintaining a series of shock waves in said duct between said inlet and said combustion zone with an attendant increase in static pressure and static temperature sufficient to create and support detonation combustion in said combustion zone;
  c. means for injecting fuel into said air stream at the upstream end of said mixing section without interfering with said series of shock waves and said supersonic laminar flow, such fuel injection means comprising a transversely extending row of injectors, each of which has a wedge-shaped upstream portion with a sharp leading edge and thin walls forming cooling passages therein, and a partially wedge-shaped downstream portion having an internal full passage therein and a plurality of elongated nozzles formed in the side walls of said partially wedge-shaped portion.

3. A detonation combustion engine adapted to produce hypersonic aircraft speeds above Mach 5, comprising:
  a. an elongated aerothermodynamic duct for receiving and directing an air stream therethrough and having an inlet, a mixing section, a combustion zone, and an exhaust;
  b. means in said duct for establishing and maintaining a series of shock waves in said duct between said inlet and said combustion zone with an attendant increase in static pressure and static temperature sufficient to create and support detonation combustion in said combustion zone; and
  c. fuel injection means having a row of nozzle elements extending transversely of said duct, said nozzle elements being spaced in said row and extending between opposed walls of said duct, each nozzle element having an elongated diamond shaped cross section with a sharp edge on the upstream side and an elongated narrow slot in the downstream edge, adjacent nozzle elements forming relatively wide converging-diverging passages therebetween for the inflowing air.

4. A detonation combustion engine adapted to produce hypersonic aircraft speeds above Mach 5, comprising:
  a. an elongated aerothermodynamic duct for receiving and directing an air stream therethrough and having an inlet, a mixing section, a combustion zone, and an exhaust;

b. means in said duct for establishing and maintaining a series of shock waves in said duct between said inlet and said combustion zone with an attendant increase in static pressure and static temperature sufficient to create and support detonation combustion in said combustion zone;

c. fuel injection means having a row of nozzle elements extending transversely of said duct, said nozzle elements being spaced in said row and extending between opposed walls of said duct, each nozzle element having an elongated diamond shaped cross section with a sharp edge on the upstream side and an elongated narrow slot in the downstream edge, adjacent nozzle elements forming relatively wide converging-diverging passages therebetween for the inflowing air, the sharp edge upstream portion of each nozzle element having relatively thin walls forming a cooling passage; and d. means for directing cooling fluid through said cooling passages.

5. A detonation combustion engine adapted to produce hypersonic aircraft speeds above Mach 5, comprising:

a. an elongated aerothermodynamic duct for receiving and directing an air stream therethrough and having an inlet, a mixing section, a combustion zone, and an exhaust;

b. means in said duct for establishing and maintaining a series of shock waves in said duct between said inlet and said combustion zone with an attendant increase in static pressure and static temperature sufficient to create and support detonation combustion in said combustion zone;

c. fuel injection means having a row of nozzle elements extending transversely of said duct, said nozzle elements being spaced in said row and extending between opposed walls of said duct, each nozzle element having an elongated diamond shaped cross section with a sharp edge on the upstream side and an elongated narrow slot in the downstream side, adjacent nozzle elements forming relatively wide converging-diverging passages therebetween for the inflowing air; and d. fuel passages formed in the walls of said duct and communicating with the opposite ends of the nozzle elements to direct fuel thereto.

6. A detonation combustion engine adapted to produce hypersonic aircraft speeds above Mach 5, comprising:

a. an elongated aerothermodynamic duct for receiving and directing an air stream therethrough and having an inlet, a mixing section, a combustion zone, and an exhaust;

b. means in said duct for establishing and maintaining a series of shock waves in said duct between said inlet and said combustion zone with an attendant increase in static pressure and static temperature sufficient to create and support detonation combustion in said combustion zone; and c. fuel injection means having a row of nozzle elements extending transversely of said duct immediately downstream of predetermined shock wave establishing means, said nozzle elements being spaced in said row and serving to inject a plurality of sheets of fuel extending between opposed walls into the air stream flowing through the duct, the opposed surfaces of adjacent nozzle elements being disposed and shaped to dissipate shock waves caused by the upstream edges of such elements.

7. A detonation combustion engine adapted to produce hypersonic aircraft speeds above Mach 5, comprising:

a. an elongated aerothermodynamic duct for receiving and directing an air stream therethrough and having an inlet, a mixing section, a combustion zone, and an exhaust;

b. means in said duct for establishing and maintaining a series of shock waves in said duct between said inlet and said combustion zone with an attendant increase in static pressure and static temperature sufficient to create and support detonation combustion in said combustion zone;

c. means for removing boundary layers from the air stream passing through said duct so as to maintain supersonic laminar flow as the stream passes from the inlet to the combustion zone; and d. fuel injection means having a row of nozzle elements extending transversely of said duct immediately downstream of said boundary layer air removing means, said nozzle elements being spaced in said row and serving to inject a plurality of thin sheets of fuel extending between opposed duct walls into the air stream flowing through the duct, the opposed surfaces of adjacent nozzle elements being disposed and shaped to dissipate shock waves caused by the upstream edges of such elements with a minimum of disturbance to the shock waves established by said shock wave establishing means.

* * * * *